US 8,340,892 B2

(12) United States Patent
Long et al.

(10) Patent No.: US 8,340,892 B2
(45) Date of Patent: Dec. 25, 2012

(54) ONBOARD AIRCRAFT WEIGHT AND BALANCE SYSTEM

(75) Inventors: Michael A. Long, Freeland, WA (US); Geoffrey E. Gouette, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 12/950,983

(22) Filed: Nov. 19, 2010

(65) Prior Publication Data

US 2011/0087424 A1 Apr. 14, 2011

Related U.S. Application Data

(62) Division of application No. 11/560,451, filed on Nov. 16, 2006, now Pat. No. 7,967,244.

(51) Int. Cl.
*G06F 17/10* (2006.01)
*G06G 7/48* (2006.01)

(52) U.S. Cl. ... 701/124; 73/65.05; 73/65.06; 244/102 A; 244/103 R; 244/104 FP

(58) Field of Classification Search ............... 244/100 R, 244/102 R, 103 R, 102 SS, 104 R, 104 FP; 701/16, 124; 73/65.05, 65.06
See application file for complete search history.

(56) References Cited

U.S. PATENT DOCUMENTS

| | | | |
|---|---|---|---|
| 2,443,045 A | 6/1948 | Bender, Jr. et al. | |
| 2,453,607 A * | 11/1948 | Wardle et al. | 73/65.06 |
| 3,203,234 A | 8/1965 | Wescott, Jr. et al. | |
| 3,310,976 A * | 3/1967 | Bertram et al. | 73/65.06 |
| 3,488,997 A * | 1/1970 | Kliever | 73/65.06 |
| 3,513,300 A | 5/1970 | Elfenbein et al. | |
| 3,584,503 A | 6/1971 | Senour | |
| 3,701,279 A * | 10/1972 | Harris et al. | 73/65.06 |
| 4,312,042 A | 1/1982 | Bateman | |
| 4,506,328 A * | 3/1985 | Bateman | 340/443 |
| 4,507,742 A | 3/1985 | Bateman | |
| 4,550,385 A * | 10/1985 | Pulk et al. | 702/140 |
| 4,850,552 A | 7/1989 | Darden et al. | |
| 5,050,087 A | 9/1991 | Walrath et al. | |
| 5,205,514 A | 4/1993 | Patzig et al. | |
| 5,214,586 A | 5/1993 | Nance | |
| 5,257,756 A | 11/1993 | Patzig et al. | |
| 5,521,827 A * | 5/1996 | Lindberg et al. | 701/124 |
| 5,548,517 A * | 8/1996 | Nance | 701/124 |
| 5,610,372 A | 3/1997 | Phillips et al. | |
| 6,032,090 A * | 2/2000 | von Bose | 701/37 |
| 6,128,951 A * | 10/2000 | Nance | 73/178 T |
| 6,237,406 B1 * | 5/2001 | Nance | 73/178 T |
| 6,237,407 B1 * | 5/2001 | Nance | 73/178 T |
| 2006/0283239 A1 | 12/2006 | Leroy et al. | |

* cited by examiner

Primary Examiner — Philip J Bonzell
(74) Attorney, Agent, or Firm — Haynes and Boone, LLP

(57) ABSTRACT

An onboard system and method for determining the instantaneous weight and balance of an aircraft simply, reliably, accurately, and requiring a minimum amount of calibration includes a memory for storing previously determined breakout friction data of the aircraft's landing gear shock struts, sensors for sensing the pressures in the struts, the vertical loads exerted by the landing gear on the aircraft, and the attitude of the aircraft relative to the horizontal during loading or unloading thereof, and a computer for computing the vertical load in each of the landing gears from the stored calibration breakout friction data and the shock strut pressures, landing gear vertical loads and aircraft attitude sensed during the loading or unloading. The computer then computes the gross weight of the aircraft and the location of its center of gravity (CG) using the computed vertical loads in the landing gears.

20 Claims, 3 Drawing Sheets

ONBOARD AIRCRAFT WEIGHT AND BALANCE SYSTEM

RELATED APPLICATIONS

This divisional patent application claims priority to and the benefit of U.S. patent application Ser. No. 11/560,451, filed Nov. 16, 2006, which is incorporated herein by reference in its entirety.

BACKGROUND

This disclosure relates to aircraft in general, and in particular, to a system carried aboard an aircraft, such as a large commercial jetliner, that is capable of providing the instantaneous weight and balance of the aircraft, i.e., its total weight and the location of its center of gravity (CG), in a quick, reliable and accurate manner.

An aircraft's weight and balance is one of the most critical factors affecting its flight safety. An overweight aircraft, or one whose center of gravity is outside the allowable limits, is both inefficient and dangerous to fly. The responsibility for proper weight and balance control begins with the engineers and designers who design the aircraft, and extends to the Aviation Maintenance Technician (AMT) who maintains the aircraft, the "loadmaster" who is responsible for loading fuel, baggage and cargo aboard it, and ultimately, to the pilot who operates it.

Two elements are vital in an aircraft's weight and balance determinations: The total weight of the aircraft must be no greater than the maximum gross weight allowable for the particular make and model of the aircraft and the particular types of flight operations that it is to undertake; and the location of its CG, or the point at which all of the weight of the aircraft is considered to be concentrated, relative to its center of lift (COL) or mean aerodynamic chord (MAC), which must be maintained within the range allowable for the particular operational weight of the aircraft. Weight and CG determine field lengths, rotation velocities, decision speeds, and horizontal stabilizer settings. CG must be considered relative to the landing gear positions to control loading and ground handling characteristics.

An aircraft's initial weight and balance is determined while the aircraft is situated on the ground. Accordingly, one practical way of determining an aircraft's weight and balance is to measure the respective loads imposed on the ground by the aircraft's landing gear and its attitude relative to the horizontal, if any, and then, using a well-known algorithm, to calculate the aircraft's weight and CG location. The best way to determine the landing gear ground loads is to measure them directly, i.e., with a calibrated scale placed under each gear. However, this is a fairly impractical technique for very large aircraft that may be deployed in field locations that lack the requisite weighing facilities. Consequently, weight and balance measurement systems that are carried onboard the aircraft have been developed in an effort to address this problem, but unfortunately, they are complex, expensive, heavy, difficult to calibrate and maintain, and cumbersome to use.

In light of the foregoing, there is a long-felt but as yet unsatisfied need in the aviation industry for an onboard aircraft weight and balance measurement system that is accurate, reliable, less expensive, lighter in weight, and easier to calibrate, maintain and use in the field.

BRIEF SUMMARY

In accordance with the exemplary embodiments thereof described and illustrated herein, the present invention provides onboard aircraft weight and balance systems and methods for using them that are accurate, reliable, inexpensive, light in weight, and easier to calibrate, maintain and use in the field than prior art onboard weight and balance systems.

In one example embodiment, a method for determining the weight and balance of an aircraft having a plurality of landing gears, each having a pneumatic shock strut, comprises:

storing breakout friction data of respective ones of the shock struts of each of the landing gears, the stored calibration data including a plurality of successive constant breakout pressures of each strut observed during a calibration loading and unloading of the air-craft, and a plurality of breakout friction forces associated with respective ones of the breakout pressures and computed as a function of the respective breakout pressures and an actual load acting on the strut;

sensing the pressures in respective ones of the landing gear shock struts during a subsequent loading or unloading of the aircraft;

sensing the vertical loads exerted by respective ones of the landing gear on the aircraft during the subsequent loading or unloading thereof;

sensing the attitude of the aircraft relative to the horizontal during the subsequent loading or unloading thereof; and, computing the vertical load in each of the landing gears from the stored calibration breakout friction data and the shock strut pressures, landing gear unsprung masses, landing gear loads and aircraft attitude sensed during the subsequent loading or unloading thereof.

A better understanding of the above and many other features and advantages of the novel onboard aircraft weight and balance systems and methods for using them of the present invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

This invention provides a reliable, accurate determination of the weight and balance of an aircraft, i.e., its gross weight and the location of its CG, while the aircraft is situated on the ground, using a simple measurement system carried entirely onboard the aircraft. Although onboard systems currently exist for making weight and balance determinations, the prior art systems are quite complex, expensive, and cumbersome to use.

Figure 1:
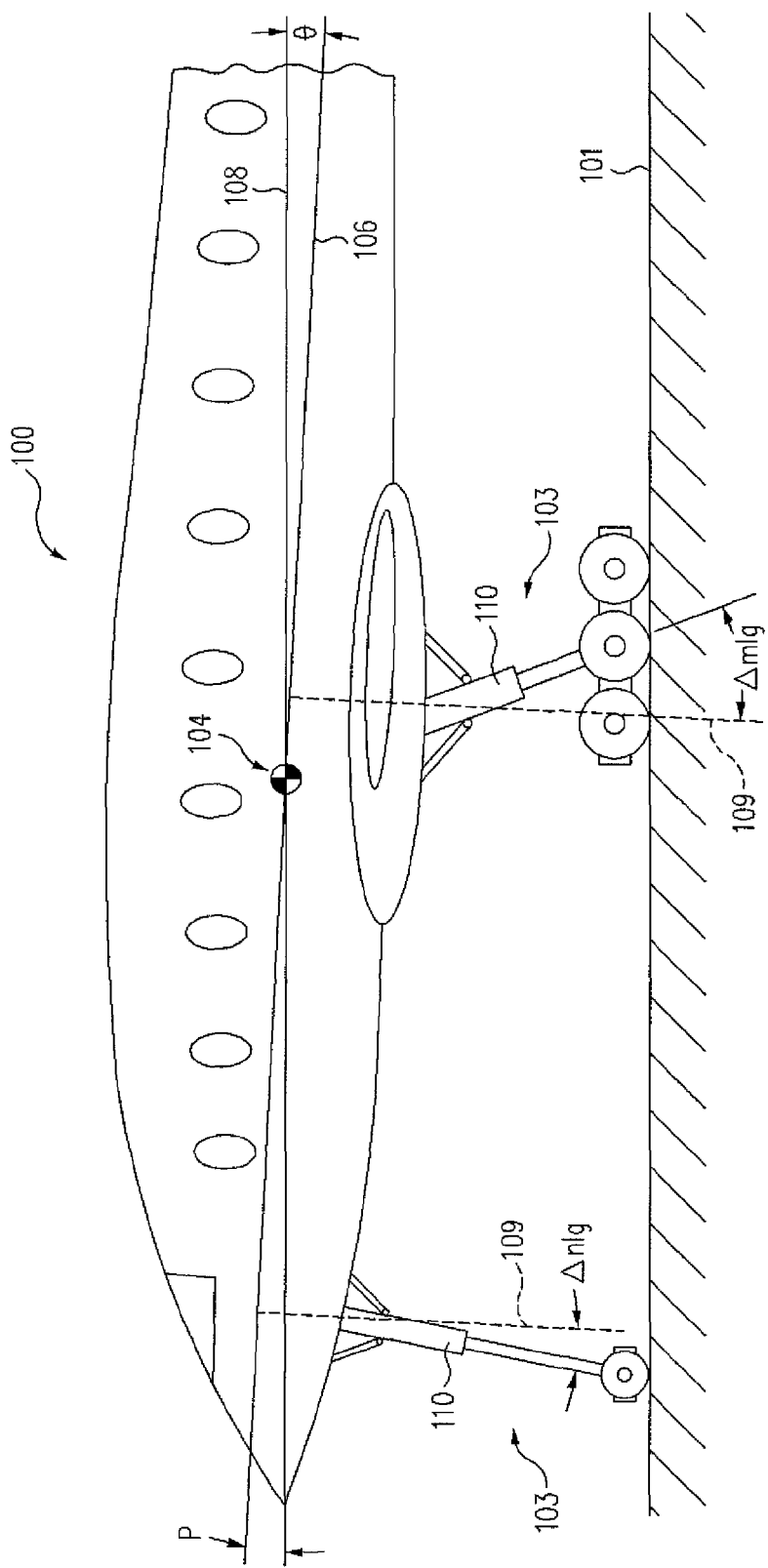
FIG. 1 is left side elevation view of an aircraft incorporating an exemplary embodiment of an onboard system for determining the weight and balance of the aircraft in accordance with the present invention.

As illustrated in FIG. 1, the weight and balance of an aircraft 100 is determined by measuring the respective vertical loads imposed on the ground 101 by the aircraft's landing gear 103, and then, using the known locations of the landing gear relative to a selected datum point (not illustrated), the total weight of the aircraft and the location of its CG 104 are computed using a known algorithm. Since such measurements contemplate that the aircraft is disposed perfectly horizontally, and that the landing gear is positioned orthogonally to the aircraft, any deviation of the aircraft's actual position 106 from the horizontal 108, such as the pitch attitude P in FIG. 1, as well as any deviation Δ of the gear from a line 109 perpendicular to the aircraft, must be taken into account in the computation. Pitch attitude, if any, is typically determined using, e.g., the aircraft's onboard Inertial Navigation System (INS) before the final computation is made, whereas, the angle Δ of the landing gear relative to the aircraft is fixed and determined at the time the aircraft is designed.

One way of determining landing gear loads from inside of the aircraft 100 is by measuring the pressure in the shock struts 110 of the landing gear 103 with pressure sensors, then calculating the frictional forces acting in the struts. As those of skill in the art will appreciate, this latter determination is an important consideration, since the actual load-pressure response of a large aircraft shock strut to the application of monotonically increasing or decreasing loadings is not a single, smooth, linear response curve, but rather, a series of "stair-step" responses, such as the two "loading" and "unloading" response curves respectively illustrated in FIG. 2 by the dashed lines 112 and 114, which result from the operation of these frictional forces.

Figure 2:
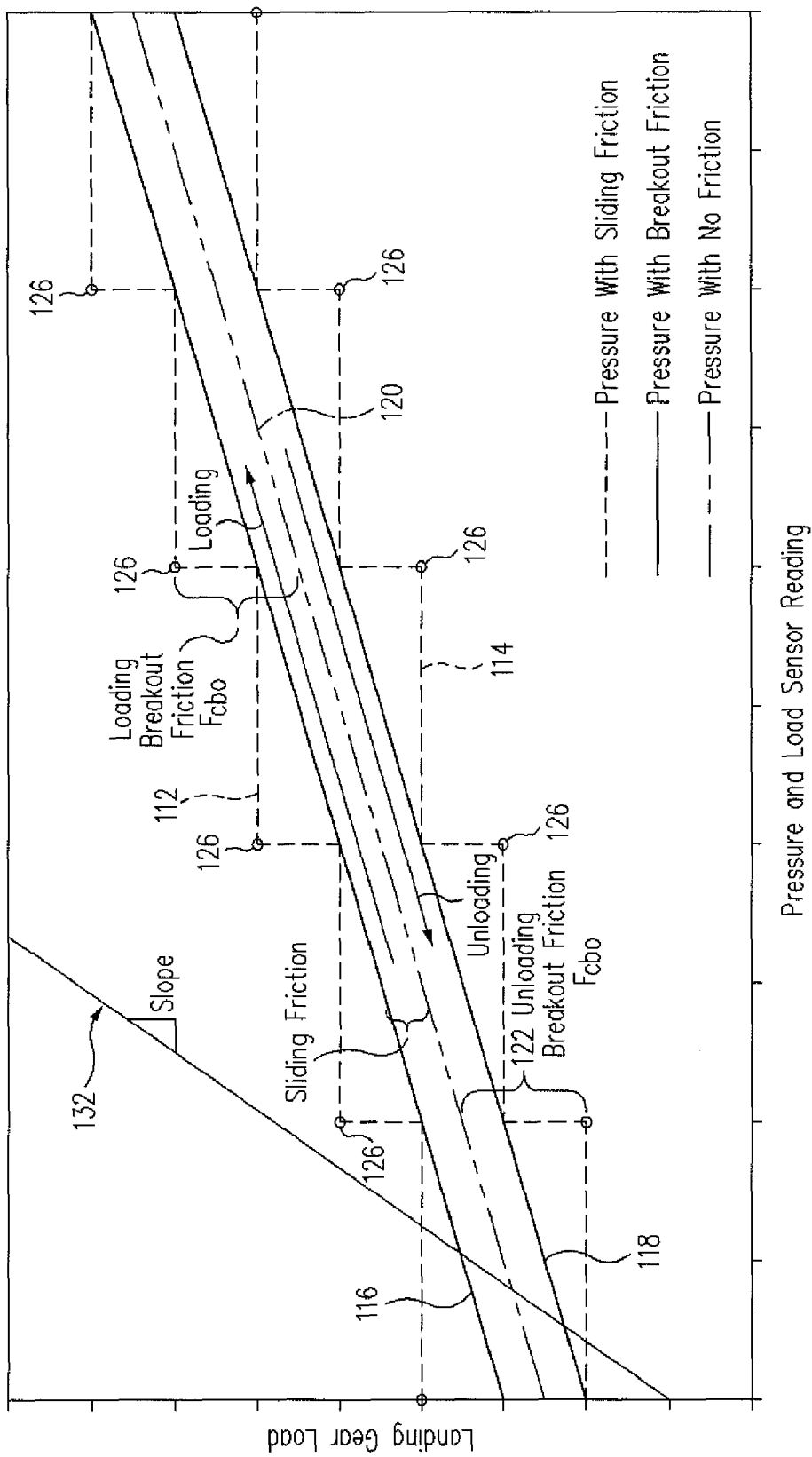
FIG. 2 is a graphical illustration of the load versus shock strut pressures and load sensor reading relationships of the landing gear shock struts and landing gear of the aircraft of FIG. 1, showing the effects of the breakout and sliding friction in the struts on the pressures sensed therein; and, FIG. 3 is a schematic side elevation view of the exemplary onboard system for determining the weight and balance of the aircraft.

As illustrated in the graph of FIG. 2, as a shock strut 110 is either loaded or unloaded, the fluid pressure within the strut tends to remain constant over a relatively substantial interval, because no relative movement occurs between the two opposite ends of the shock strut until the static friction force in the shock strut that resists the movement, referred to herein as the "breakout friction," is overcome, at which point, the two ends of the shock strut either move suddenly toward (during loading) or apart from each other (during unloading), and resulting in a sudden increase or decrease, respectively, in the pressure sensed in the shock strut. That is, the static friction in the strut acts to resist compression of the strut during loading and extension thereof during unloading. Accordingly, to obtain an accurate determination of the load acting through a shock strut, and hence, through the landing gear 103, it is essential to take into account the effects of the friction forces acting in the strut.

One known approach using this method attempts to calculate shock strut friction by pumping hydraulic fluid into and out of each shock strut 110. While this can be a fairly accurate method for determining shock strut friction, it results in a system that is complex and heavy.

The present invention monitors shock strut pressures and calculates shock strut friction. Load sensor readings are then used to further increase the accuracy of the landing gear loads. Accordingly, the system of the present invention does not require the complexity, hardware and weight of an additional system to pump hydraulic fluid in and out of the shock struts, and precludes the added risk of leakage of the shock strut fluid from the pump-type system components.

As illustrated graphically in FIG. 2, shock strut 110 friction is of two types, viz., a static, or "breakout" friction, which must be overcome for shock strut movement to occur, as well as a dynamic, or "sliding" friction component, which continues to resist movement. If no friction forces were acting in the strut, the load versus pressure relationship for both loading and unloading of the strut would be represented by the single, smooth phantom line 120 in FIG. 2, and if only dynamic or sliding friction were acting, the load versus pressure relationship would be represented by a respective one of the two solid lines 116 (for loading) and 118 (for unloading).

Typically, as load, e.g., passengers, luggage, cargo, fuel, food, equipment and supplies, is applied to the strut 110, i.e., when the airplane 100 is first being loaded for a flight operation, there is initially no movement of the strut, and therefore, no change in the pressure measured within it. However, once the load overcomes the static breakout friction $F_{cbo}$ acting in the strut, the strut begins to compress, thereby raising the pressure in the strut to a new value. As illustrated in FIG. 2, as the pressure in the strut at one of these breakout pressures begins to rise, a point is reached at which the force resulting from the pressure and the sliding friction equals the force exerted by the load and the shock strut stops compressing, and this "stair step" pattern occurs repeatedly during the loading of the aircraft 100, resulting in the stair-step load versus pressure plot 112 of FIG. 2. The reverse of the foregoing pattern is exhibited during the unloading of the aircraft, as represented by the dashed line 114 of FIG. 2.

Therefore, by simply calibrating load versus pressure for the shock strut 110 during an initial "calibration" loading and unloading of the aircraft 100, the relationship between the breakout friction force $F_{cbo}$, strut pressure and load relationship of the strut can be determined and stored, e.g., in a lookup table, beforehand. Depending on the repeatability of the data, this initial calibration may need to be performed on each landing gear or may be done once and used on all substantially similar landing gear. Then, to calculate shock strut loads during a subsequent loading or unloading operation of the aircraft, breakout pressures (designated by the small circles 126 in FIG. 2) are continuously recorded during the loading and unloading process. Breakout pressures of the strut are determined by recording the pressure in the strut, waiting for a pressure change to occur for some period of time (e.g., 1 second), and if no pressure change occurs, selecting the constant pressure measured (i.e., the pressure measured just prior to the next pressure change) as the breakout pressure. Additionally, it may be noted that, by observing the past breakout pressures during a loading or an unloading operation, the system can also determine automatically whether the aircraft is being loaded or unloaded. Based on the breakout friction calibration data, the operative breakout friction $F_{cbo}$ can then be retrieved from the lookup table and added to (for loading) or subtracted from (for unloading) the pressure based load (L=P*A), where L is the shock strut load, P is the shock strut pressure and A is the cross-sectional area of the shock strut piston, depending on whether the gear is in a loading or unloading mode, to determine the actual gear load, with good accuracy.

However, as may be seen by reference to FIG. 2, this initial determination either underestimates the actual shock strut loading during a given loading operation, or overestimates it during an unloading operation, depending on the final actual position on the load versus pressure curve relative to the last or immediately previous breakout pressure 126 used as the basis for the computation. However, using data from load sensors recorded during the loading or unloading process, the accuracy of the initially calculated shock strut load value can be improved so as to arrive at the actual strut load value, in the manner described below.

Figure 3:
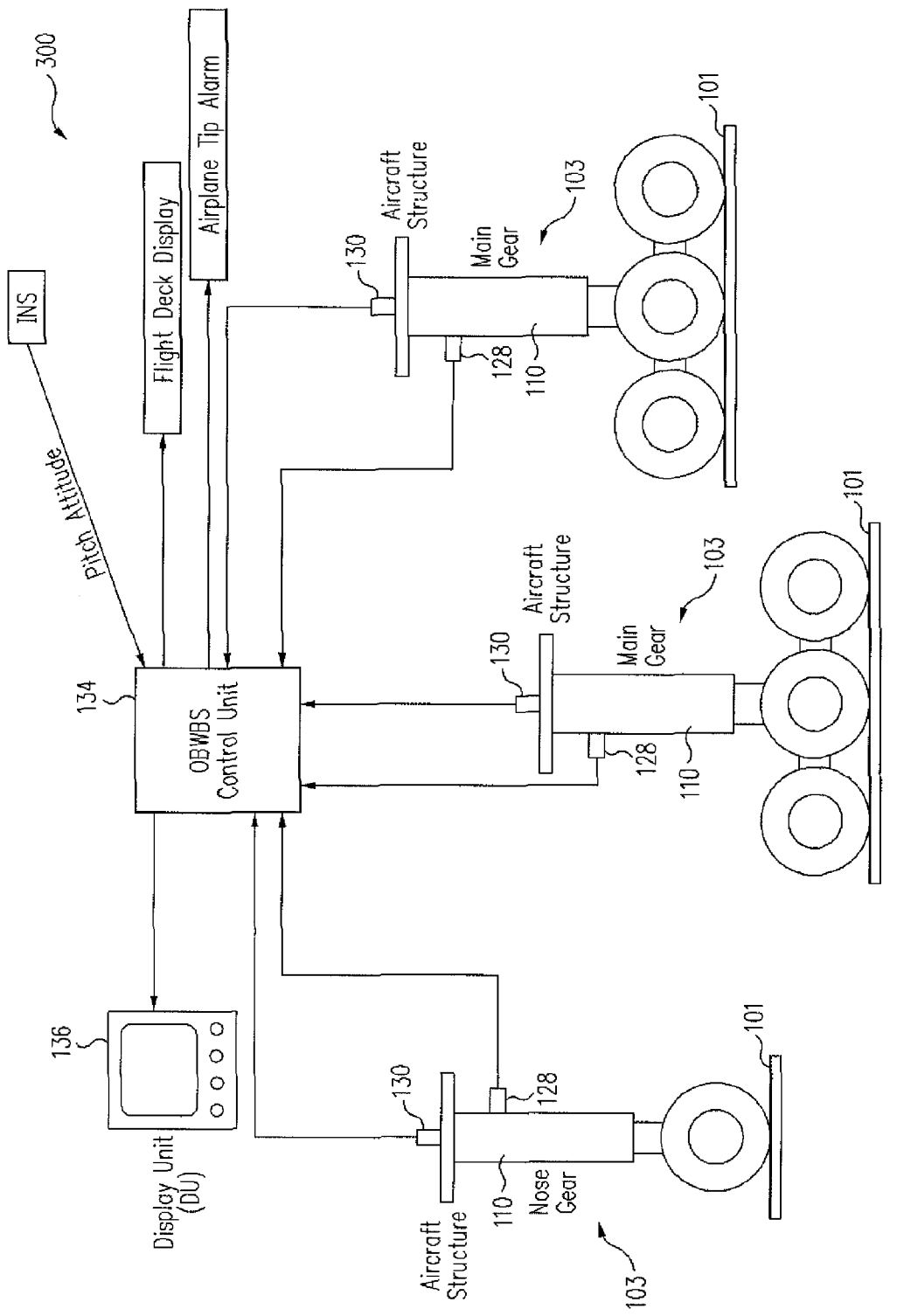

To further increase the accuracy of the strut load measurement, a "delta load" between the breakout pressure load and the current state can be calculated using a gear load sensor 130, as illustrated in FIG. 3. The load from the gear load sensor is recorded at the time of the last breakout pressure $P_{cbo}$ (i.e., just prior to a pressure change point 126) and the present state. The difference between these loads are added to the vertical load calculation based on the breakout pressure, as above. The load on each landing gear 103 can then be obtained (i.e., during times of constant pressure in the landing gear shock strut) by calculating the pressure times the area, including the breakout friction effects, and adding the difference in the load sensor.

An exemplary embodiment of an onboard system 300 for determining an aircraft's weight and balance in accordance with the present invention is illustrated in FIG. 3. In the exemplary system, to further improve the accuracy of the load measurements from the shock strut 110 pressure sensors 128, the delta load, i.e., the difference in load between the current load and the load measured at the time of the breakout pressure 126, can be calculated for the strut using conventional gear load sensors 130. In the particular exemplary embodiment illustrated, the gear load sensors 130 each measures strain acting on the landing gear or on structure of the aircraft 100, at the respective upper ends of the landing gear 103 of the aircraft. These types of sensors are typically incorporated in large aircraft to provide a means by which the onboard avionics system can automatically determine whether the landing gear of the aircraft is in contact with the ground 101, e.g., a runway or tarmac. As will be understood, although such gear load sensors are not sufficiently accurate for measuring absolute load values in the landing gears, they are capable of measuring relative values quite accurately, and are therefore useful for "extrapolating" beyond the measured breakout pressures $P_{cbo}$ 126, in the following manner.

As illustrated in FIG. 2, the load sensors 130 each exhibits a single, straight line load versus strain (e.g. an output voltage reading) in response to the loading or unloading of the aircraft 100, as represented by the sloped line 132 therein.

The load measured by respective ones of the gear load sensors 130 is recorded by the computerized onboard weight and balance system (OBWBS) control unit 134 at the time of the last constant shock strut 110 pressure measurement $P_{cbo}$ (i.e., that just prior to another pressure change), as above, and the change in the load measured by the load sensor between that measurement and the present is computed and added to the calculated vertical strut pressure based load calculated at that same time, as described above. The precise load on each landing gear 103 is thus obtained (during times of constant pressure in the landing gear shock strut) by calculating the measured strut pressure times the piston area of the strut, as above, adding or subtracting the appropriate amount of breakout friction force $F_{cbo}$, and then adding the difference in the load sensor 130 reading times the slope (i.e., rise over run) of the load sensor reading line 132 shown in FIG. 2.

Additionally, since the aircraft 100 may be positioned on the ground 101 at, for example, a pitch angle P relative to the horizontal 108, such as that shown in FIG. 1, a pitch attitude sensor, e.g., that included in the aircraft's INS, can be used to resolve the foregoing pressure based load determination trigonometrically into the component of interest, viz., the vertical load component in the respective landing gears 103. As discussed above, the precise location of the landing gear on the aircraft, as well as any deviation of the landing gear from perpendicular to the aircraft is known beforehand from the design of the aircraft and programmed into the computer (or control unit) of the system as fixed or constant values.

Thus, in operation, the control unit 134 of the system 300 constantly monitors the shock strut 110 pressure in each landing gear 103 while the aircraft 100 is on the ground, and the respective vertical load on each gear is also measured by the load sensors 130 disposed at the respective upper ends of the landing gears. As discussed above, the control unit recognizes a constant breakout pressure ($P_{cbo}$) by observing a constant pressure over a selected interval of time, followed by a steady change in pressure that increases during loading and decreases during unloading. The particular breakout pressure $P_{cbo}$ of interest in computing the current load on the respective landing gear is that constant breakout pressure $P_{cbo}$ measured just prior to the current pressure measured, i.e., before the next, incipient breakout pressure. At the same time (i.e., just prior to the next pressure change), a breakout load ($L_{cbo}$) from the load sensor 130 is also recorded. Breakout friction ($F_{cbo}$) is then determined as a function of the last constant breakout pressure $P_{cbo}$ by reference to a value stored in the memory, e.g., a lookup table, in the system's control unit 134.

The calibration, or lookup table data, is generated early in the aircraft's initial rollout (i.e., after a few test flight cycles and prior to delivery to the customer) by placing the landing gear 103 of the aircraft 100 on respective scales and monitoring the frictional breakout forces of the respective shock struts 110 of the landing gears as a function of the pressures measured therein and the actual loads acting thereon, as measured by the scales, as the airplane is loaded and unloaded with dummy weights, e.g. sandbags, and these values are then stored in the memory of the system's control unit 134. This calibration procedure can also be repeated later in the life of the aircraft if it is believed that the calibration data has changed significantly for some reason, e.g., if one or more of the shock struts become worn or are replaced with struts having response curves substantially different from the previously stored response curves.

The equation used by the computer for computing the current vertical landing gear load ($L_v$) in each landing gear 103 during a subsequent loading or unloading of the aircraft 100 is as follows:

$$L_v = [(F_f - F_{cbo})/\cos\theta] + (L_f - L_{cbo}) + L_{unsprung}$$
$$= [(P_{cbo} \times A - F_{cbo})/\cos\theta] + (L_f - L_{cbo}) + L_{unsprung},$$

where $F_f$ is the force acting in the shock strut 110 at the "last" or immediately preceding constant breakout pressure $P_{cbo}$, i.e., $P_{cbo} \times A$, exclusive of the effects of the stored calibration breakout friction force $F_{cbo}$ associated with that breakout pressure in the system memory;

A is the effective piston cross-sectional area of the shock strut;

θ is the effective angle of the landing gear 103 relative to vertical, inclusive of the pitch of the aircraft, if any, and any variation in perpendicularity of the gear relative to the aircraft (θ=P+Δ);

$L_f$ is the current load in the landing gear 103, as measured by the respective load sensor 132 thereof;

$L_{cbo}$ is the landing gear load measured by the respective load sensor at the last or immediately preceding constant breakout pressure $P_{cbo}$, and, $L_{unsprung}$ is the total weight of the landing gear components that are not supported by the pressure in the shock strut (e.g., truck beams, axes, wheels, tires, brakes, and the like).

It may be noted in the foregoing relationship that, since the load sensors 130 sense only the vertical component of the loads acting on the aircraft 100 by the landing gear 130, it is not necessary to resolve these loads vertically by their multiplication with 1/cos θ.

The loads acting on the respective landing gears 103 are then simply added together by the computer of the control unit 134 to derive the aircraft's current gross weight, and using the known positions of the landing gear 103 on the aircraft stored in the control system, their respective moments about a selected datum point are computed, totaled and divided by the gross weight to determine the location of the aircraft's CG 104 relative to the datum point. In one exemplary embodiment, the current weight and balance information may be continuously computed and displayed, e.g., to the pilot on the flight deck and/or a loadmaster in the cargo bay, on a Display Unit (DU) 136 located in the cockpit or cargo bay of the aircraft 100, as illustrated in FIG. 3. The combination of pressure and load sensor readings thus provides a unique, simple, reliable, accurate, inexpensive and light weight system for determining an aircraft's weight and the location of its CG 104 with a minimal amount of calibration testing being required.

The data from the Onboard Aircraft Weight and Balance System can also be used to provide an Aircraft "Tip Alarm" that warns the loadmaster that the airplane CG is nearing the main gear fore/aft location. If the CG moves aft of the aftmost main landing gear, the aircraft can tip back onto its tail, causing extensive aircraft and cargo damage, as well as injury to personnel in the vicinity. In order to prevent this type of accident from happening, the weight and balance system continuously computes the location of the CG, and when it approaches the airplane tipping limit, provides an aural, visual, or other warning. In addition to providing a warning, it can also be programmed to prevent the cargo handling system from moving or transferring any more cargo aft. A tip alarm is not a new or novel concept, having been used in previous weight and balance systems, but the invention described herein is also easily capable of providing this additional and useful function.

By now, those of skill in this art will appreciate that many modifications, substitutions and variations can be made in and to the onboard systems and methods for determining an aircraft's weight and balance of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A method for determining the weight and balance of an aircraft having a plurality of landing gears, each including a pneumatic shock strut, the method comprising:
   storing breakout friction data in a computer having recordable memory of respective ones of the shock struts of each of the landing gears, the stored calibration data including a plurality of successive constant breakout pressures of each strut observed during a calibration loading and unloading of the aircraft, and a plurality of breakout friction forces associated with respective ones of the breakout pressures and computed as a function of the respective breakout pressures and an actual load acting on the strut;
   sensing pressures in respective ones of the landing gear shock struts during a subsequent loading or unloading of the aircraft;
   sensing vertical loads exerted by respective ones of the landing gear on the aircraft during the subsequent loading or unloading thereof;
   sensing an attitude of the aircraft relative to the horizontal during the subsequent loading or unloading thereof; and,
   computing a vertical load in each of the landing gears from the stored calibration breakout friction data and the shock strut pressures, landing gear unsprung masses, landing gear loads and aircraft attitude sensed during the subsequent loading or unloading thereof.

2. The method of claim 1, wherein computing the vertical load in each landing gear comprises:
   identifying an immediately preceding constant breakout pressure Pcbo of the strut and determining a breakout friction force Fcbo associated therewith, based on the calibration breakout friction data stored in the memory of the computer;
   multiplying the identified constant breakout pressure Pcbo by an effective piston cross-sectional area A of the strut to obtain a load in the strut exclusive of the effects of the breakout friction force Fcbo acting therein;
   including the breakout friction force Fcbo from the load exclusive of the effects of the breakout friction force to obtain a force acting in the strut inclusive of the effects of the breakout friction force;
   resolving a force acting in the strut inclusive of the effects of the breakout friction force into a vertically acting component, based on the attitude of the aircraft and a fixed angle of the strut relative thereto;
   subtracting a load Lcbo in the landing gear measured by a respective load sensor of the landing gear at the breakout pressure Pcbo from a load Lf in the landing gear measured by the load sensor at the current time to obtain a delta load of the landing gear; and,
   adding the delta load to the vertically acting component of the force acting in the shock strut inclusive of the effects of the breakout friction force and adding the unsprung mass to obtain the current vertical load $L_v$ in the landing gear.

3. The method of claim 1, wherein storing breakout friction data of respective ones of the shock struts of each of the landing gears comprises:
   placing each of the landing gear of the aircraft on a respective scale;
   loading and unloading the aircraft with weights;
   monitoring the pressures in the respective shock struts of the landing gears during the loading and unloading of the aircraft;
   identifying a plurality of successive constant breakout pressures of each strut occurring during the loading and unloading of the aircraft;
   computing a breakout friction force associated with each of the breakout pressures as a function of the breakout pressure and an actual load acting on the strut as measured by a respective scale; and,
   storing the values of the breakout pressures and associated frictional breakout forces in the memory of the system.

4. The method of claim 1, wherein storing the breakout friction data of the shock struts comprises storing the data in a lookup table.

5. The method of claim 1, wherein sensing the vertical loads exerted by respective ones of the landing gear comprises sensing the loads by measuring strain.

6. The method of claim 1, wherein sensing the attitude of the aircraft relative to the horizontal comprises sensing the attitude with an Inertial Navigation System (INS) of the aircraft.

7. The method of claim 1, further comprising:
   placing each of the landing gear of the aircraft on a respective scale;
   loading and unloading the aircraft with weights;
   monitoring the pressures in the respective shock struts of the landing gear during the loading and unloading of the aircraft;

identifying a plurality of successive constant breakout pressures of each strut occurring during the loading and unloading of the aircraft;

computing a breakout friction force associated with each of the breakout pressures as a function of the breakout pressure and an actual load acting on the strut as measured by the respective scales; and, storing the values of the breakout pressures and the associated frictional breakout forces in the memory of the system.

8. The method of claim 1, further comprising:

sensing the location of the aircraft's CG relative to the fore-and-aft location of the aircraft's main gear; and, generating a tip alarm when the aircraft's CG moves to within a preselected distance relative to the fore-and-aft location the aircraft's main gear.

9. An aircraft having a weight and balance determined in accordance with the method of claim 1.

10. The method of claim 1, further comprising:

sensing a location of the aircraft's CG relative to a fore-and-aft location of the aircraft's main gear; and, generating a tip alarm when the location of the aircraft's CG moves to within a preselected distance relative to the fore-and-aft location the aircraft's main gear.

11. The method of claim 1, further comprising:

adding together the vertical loads in each of the landing gear to obtain a gross weight of the aircraft;

multiplying the respective vertical loads in the landing gears by respective distances of the landing gears to a selected datum point to obtain the respective moments of the vertical loads about the datum point;

adding together the respective moments of the vertical loads about the datum point to obtain a total moment of the vertical loads about the datum point; and, dividing the total moment by a gross weight of the aircraft to determine the location of a center of gravity (CG) of the aircraft relative to the datum point.

12. The method of claim 11, further comprising visibly displaying the current gross weight and location of the center of gravity (CG) of the aircraft.

13. A method for determining the weight and balance of an aircraft having a plurality of landing gear, each including a shock strut, the method comprising:

installing an onboard system for determining the weight and balance of the aircraft aboard the aircraft, the system including:

a memory storing calibration data comprising breakout friction data of respective ones of the shock struts of each of the landing gears, the stored calibration data including a plurality of successive constant breakout pressures of each strut observed during a calibration loading and unloading of the aircraft and a plurality of breakout friction forces associated with respective ones of the breakout pressures and computed as a function of the respective breakout pressures and an actual load acting on the strut during the calibration loading and unloading;

pressure sensors for sensing the pressures in respective ones of the landing gear shock struts during a subsequent loading or unloading of the aircraft;

load sensors for sensing the vertical loads exerted by respective ones of the landing gear on the aircraft during the subsequent loading or unloading thereof;

an attitude sensor for sensing the attitude of the aircraft relative to the horizontal during the subsequent loading or unloading thereof; and, a computer operable to compute the actual vertical load $L_{.sub.v}$ acting in each of the landing gears during the subsequent loading or unloading from the calibration shock strut breakout friction data stored in the memory, the shock strut pressures sensed with the pressure sensors, landing gear unsprung loads, landing gear loads sensed with the load sensors and attitude of the aircraft sensed with the attitude sensor.

14. The method of claim 13, further comprising:

sensing the pressures in respective ones of the landing gear shock struts during a loading or an unloading of the aircraft;

sensing the loads exerted on the aircraft by respective ones of the landing gears during the loading or unloading;

sensing the attitude of the aircraft relative to the horizontal during the loading or unloading;

computing the vertical load in each of the landing gears from the stored calibration breakout friction data and the shock strut pressures, landing gear unsprung masses, landing gear loads and aircraft attitude sensed during the subsequent loading or unloading;

computing a gross weight of the aircraft and a location of its center of gravity (CG) relative to a selected datum point using the computed vertical loads in the landing gears;

adding together the vertical loads in each of the landing gear to obtain the gross weight of the aircraft;

multiplying the respective vertical loads in the landing gears by the respective distances of the landing gears to the selected datum point to obtain the respective moments of the vertical loads about the datum point;

adding together the respective moments of the vertical loads about the datum point to obtain the total moment of the vertical loads about the datum point; and, dividing the total moment by the gross weight of the aircraft to determine the location of the center of gravity (CG) of the aircraft relative to the datum point.

15. The method of claim 13, further comprising:

placing each of the landing gear of the aircraft on a respective scale;

loading and unloading the aircraft with weights;

monitoring the pressures in the respective shock struts of the landing gear during the loading and unloading of the aircraft;

identifying a plurality of successive constant breakout pressures of each strut occurring during the loading and unloading of the aircraft;

computing a breakout friction force associated with each of the breakout pressures as a function of the breakout pressure and the actual load acting on the strut as measured by the respective scales; and, storing the values of the breakout pressures and the associated frictional breakout forces in the memory of the system.

16. An aircraft having a weight and balance determined in accordance with the method of claim 13.

17. A method for determining the weight and balance of an aircraft, the method comprising:

using a pressure sensor to sense a breakout friction force acting in a landing gear shock strut of the aircraft during a loading or unloading of the aircraft;

computing a load acting in the landing gear as a result of the breakout friction force sensed, using a computer having recordable memory;

using a load sensor to sense the loads exerted on the aircraft by the landing gear during the loading and unloading; and, using the load sensed by the load sensor to correct the computed load acting in the landing gear.

18. The method of claim 17, wherein the computing comprises comparing the breakout friction force with a previously stored value of breakout friction force.

19. The method of claim 17, further comprising using means for sensing the attitude of the aircraft for converting the corrected load acting in the landing gear to a vertical load acting therein.

20. The method of claim 19, further comprising using the computer to compute the location of the aircraft's CG using the vertical load acting in the landing gear.

* * * * *